United States Patent [19]

Van Hoof et al.

[11] Patent Number: 4,711,824

[45] Date of Patent: Dec. 8, 1987

[54] HETEROGENEOUS WIRE AND PANE PROVIDED WITH SUCH A WIRE

[75] Inventors: Isidoor K. Van Hoof; Herman J. C. M. Aarts, both of Eindhoven, Netherlands

[73] Assignee: U.S. Philips Corporation, New York, N.Y.

[21] Appl. No.: 929,939

[22] Filed: Nov. 12, 1986

[30] Foreign Application Priority Data

Nov. 15, 1985 [NL] Netherlands .......................... 8503141

[51] Int. Cl.[4] ........................ B32B 15/00; B21C 37/00

[52] U.S. Cl. .................................... 428/607; 219/203; 219/522; 219/543; 428/665; 428/671; 428/377; 428/379

[58] Field of Search ............... 428/377, 379, 389, 615, 428/617, 618, 607, 611, 612, 620, 599, 665, 671; 219/522, 543, 203, 552, 553, 547

[56] References Cited

U.S. PATENT DOCUMENTS

| | | | |
|---|---|---|---|
| 2,106,060 | 1/1938 | Ostrander | 57/212 |
| 2,387,829 | 10/1945 | Burnham et al. | 57/212 X |
| 4,311,001 | 1/1982 | Glushko et al. | 57/212 X |
| 4,455,481 | 6/1984 | Van Hoof et al. | 428/212 X |

FOREIGN PATENT DOCUMENTS

| | | |
|---|---|---|
| 0058445 | 8/1982 | European Pat. Off. . |

*Primary Examiner*—Lorraine T. Kendell
*Attorney, Agent, or Firm*—Norman N. Spain

[57] ABSTRACT

A heterogeneous wire is disclosed which has a cladding comprising fibers of tungsten and fibers of copper and a core of the eutectic mixture of copper and silver. This eutectic mixture also connects the fibers of the cladding to each other. The wire has a high tensile strength, a low resistivity and a high ratio between these specific properties. As a result, the wire, which has a diameter of less than 50 $\mu$m, is particularly suitable to be embedded in a pane.

2 Claims, 2 Drawing Figures

HETEROGENEOUS WIRE AND PANE PROVIDED WITH SUCH A WIRE

BACKGROUND OF THE INVENTION

The invention relates to a heterogeneous wire having a diameter of less than 50 μm and having a core of a good conducting metal which is connected by fusion to a cladding comprising fibres of refractory metal, and to a pane in which such a wire is incorporated. Such a wire and such a pane are known from European Patent Specification No. 0058445.

According to this European Patent Specification, the core of the wire consists of copper, silver or gold, while the cladding consists of fibers of tungsten, molybdenum or an alloy of tungsten-molybdenum. The wire has a very small diameter in order not to be visible when incorporated in a pane. In order that it can be shaped into a suitable, for example sinusoidal form and that it can be embedded in glass that is formed into a pane, the wire must have a high tensile strength. Moreover, the wire must have a low resistivity in order that a great length of this wire, for example a few hundred meters, can be incorporated in a pane (for example for a homogeneous heating thereof), while nevertheless with the use of a given current source a sufficiently large current flows through this wire.

The wire known from this European Patent Specification has the disadvantage that it has a comparatively high resistivity, also that its resistivity is related to its tensile strength.

BRIEF SUMMARY OF THE INVENTION

The invention has for its object to provide a heterogeneous wire which is particularly suitable to be embedded as an invisible or barely visible wire in glass for the manufacture of panes. The invention more particularly has for its object to provide a heterogeneous wire of comparatively low resistivity, more particularly of a high ratio between tensile strength and resistivity, which wire can be readily manufactured. The invention further has for its object to provide a pane provided with such a wire.

In a wire of the kind described in the opening paragraph this object is achieved according to the invention in that the cladding comprises, distributed over the circumference of the wire, fibers of mainly tungsten and fibers of mainly copper and a eutectic mixture of mainly silver and copper interconnects the fibers of the cladding and constitutes the core of the wire.

The invention further relates to a pane, in which this wire is incorporated. The pane may be used, for example, as a windshield in cars, as a cockpit window in airplanes and as an alarm window pane.

DETAILED DESCRIPTION OF THE INVENTION

Figure 1:
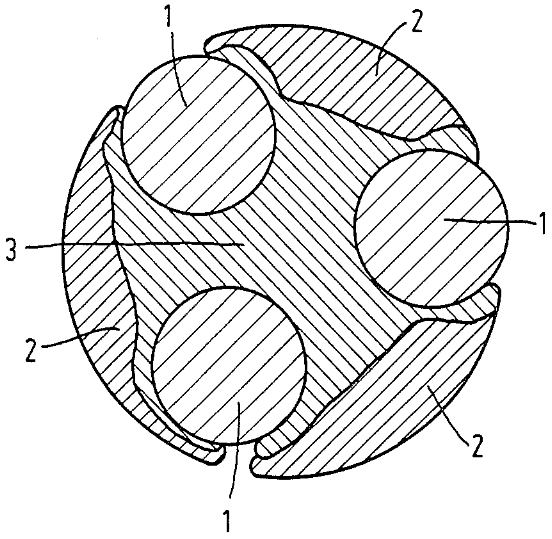
FIG. 1 is a cross-sectional view of a view of the invention.

The heterogeneous wire according to the invention can be readily manufactured by winding several tungsten and copper wires around a wire of silver. The composite wire thus obtained is then heated in order to fuse the constituent wires together. In contrast with the manufacture of the known wire, in which with a core of copper, silver or gold is employed and a temperature of at least about 1083°, 960° and 1960° C., respectively, has to be used, in the manufacture of the wire according to the invention only a temperature lying above the eutectic temperature (779° C.) need be used. A eutectic melt is then obtained, in which the tungsten wires and the remaining copper are embedded. After cooling, the heterogeneous wire obtained can be drawn to a wire of a smaller thickness with fibers of tungsten and copper surrounding a core of eutectic copper/silver and interconnected by eutectic copper/silver. In view of the lower ductility of tungsten, the cross-sections of the tungsten wires change their form during drawing to a lesser extent than the copper wires. The tungsten fibers in the heterogeneous wire thus approach the circular form in cross-section much more closely than the copper wires whose cross-sections are rather in the form of segments of a circle.

It has proved to be useful to start from a core wire of silver and in all six cladding wires of tungsten and copper, respectively. The diameter of the core wire may be chosen to be slightly larger, for example 20 to 25% larger, than that of the cladding wires. Thus it is achieved that in the manufacture of the heterogeneous wire at the stage at which the eutectic melt is present, there is a stable assembly in which the cladding wires hold each other in position in the cladding. It is further achieved that the melt has a sufficient volume to fill the space which was initially present between the wires.

The ratio between the number of tungsten wires and the number of copper wires can be varied. It is favorable to choose a heterogeneous wire comprising three tungsten wires and three copper wires alternately arranged in the cladding. The heterogeneous wire then behaves to a great extent as an isotropic wire, which facilitates the incorporation of the wire, for example in glass.

An embodiment of the wire and of the pane according to the invention will now be discussed with reference to in the drawing. and the following example.

Figure 2:
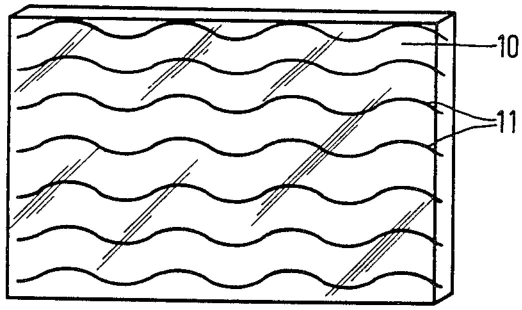
FIG. 2 is a front elevational view of a pane of the invention.

FIG. 1 shows a wire in cross-section,

FIG. 2 shows a pane in front elevation.

In FIG. 1, the heterogeneous wire of less than 50 μm, which is shown on a greatly enlarged scale, has a cladding comprising fibers 1 of a refractory metal and a core 3 of good conducting metal, which is connected by fusion to the fibers 1,2 of the cladding.

In this figure, the heterogeneous wire has fibers 1 of tungsten of substantially circular form and fibers 2 of copper whose form approaches that of segments of a circle. The fibers 1,2 are connected to each other and to the core 3 by the eutectic of silver and copper which also constitutes the core 3. The eutectic mainly comprises 28.5 parts by weight of copper and 71.5 parts by weight of silver.

The wire was obtained by winding three tungsten wires of 53 μm in diameter and three copper wires of the same diameter around a silver wire of 65 μm in diameter, the tungsten and copper wires being alternately arranged on the surface of the silver wire.

The composite assembly was heated above 779° C., the copper/silver eutectic being formed fused the whole to form a unit. The wire formed was drawn after cooling to a diameter of 44.5 μm, the cross-section of which is shown in FIG. 1. The wire had an electrical resistance of 20.5 Ω/m and a breaking strength of 385 g.

Table 1 indicates the resistivity and the tensile strength as specific properties of the heterogeneous wire as well as the ratio between the tensile strength and the resistivity. The higher this ratio, the more favorable is the ratio between the mechanical and the electrical properties.

For comparison, corresponding data are stated of the heterogeneous wire manufactured from a copper wire of 415 μm in diameter and six molybdenum wires of 400 μm in diameter as cladding wires, which after fusion is drawn to 40 μm and is known from European Patent Specification No. 0058445. Furthermore, data are stated of a heterogeneous wire according to European Patent Specification No. 0058445 manufactured from six tungsten cladding wires (φ53 μm) and a copper core wire (φ65 μm) drawn to a diameter of 44.5 μm.

TABLE 1

| heterogeneous wire | resistivity ($\times 10^{-8}$ Ohm · m) | tensile strength ($\times 10^{9}$ Pa) | tensile strength/resistivity ($\times 10^{17}$ PaOhm$^{-1}$ m$^{-1}$) |
|---|---|---|---|
| 1. 3W3Cu1Ag | 3.2 | 24 | 7.5 |
| 2. 6Mo1Cu | 3.8 | 22.4 | 5.9 |
| 3. 6W1Cu | 4.9 | 31 | 6.3 |

It appears from this table that the wire 1 (according to the invention) has a higher tensile strength and moreover a lower resistivity than the known wire 2. This becomes manifest in a considerably higher ratio of tensile strength to resistivity.

The wire 3 manufactured for further comparison (according to the said European Patent Specification) has a higher tensile strength than the wire according to the invention, it is true, but its resistivity is more than proportionally higher. As a result, the wire 3 has a more unfavorable, lower ratio than the wire 1.

Consequently, the wire 1 according to the invention has a very low resistivity and a comparatively high tensile strength, as a result of which the wire has the highest ratio of the indicated wires.

In FIG. 2, a number of sinusoidally shaped heterogeneous wires 11 according to the invention are embedded in the pane 10.

What is claimed is:

1. A composite, heterogeneous wire having a diameter of less than 50 μm and consisting of a core consisting of a eutectic mixture of silver and copper which is connected by fusion to a cladding comprising tungsten wires and copper wires distributed around the circumference of said core.

2. The composite wire of claim 1, wherein said cladding comprises three tungsten wires and three copper wires arranged alternately around the circumference of said core.

* * * * *